Patented Oct. 20, 1953

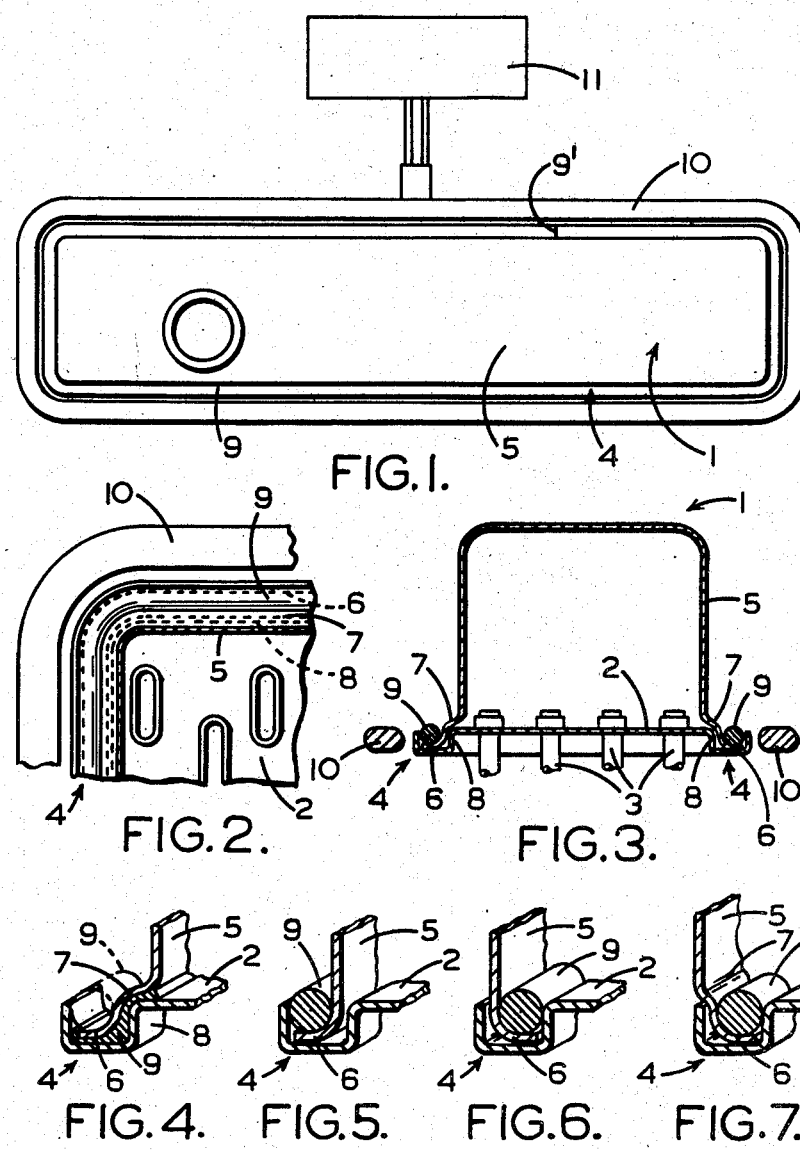

2,656,155

UNITED STATES PATENT OFFICE 2,656,155

RADIATOR

Alan Louis Garratt, Kenilworth, England, assignor to The Coventry Motor Fittings Company Limited, Coventry, England Application February 16, 1950, Serial No. 144,403
In Great Britain June 3, 1949

2 Claims. (Cl. 257—129)

1

This invention relates to radiators such as are commonly used as part of the liquid cooling system of internal combustion engines and in particular relates to the header tanks of such radiators and has for its primary object to provide an improved construction and arrangement of joint between the parts to be soldered.

The present invention also has as an object to provide a construction and arrangement of joint which lends itself for rapid economic and uniform soldering by means of solder fused by high frequency induction heating.

In the accompanying drawings,

Figure 1 is a diagrammatic plan view of a radiator header tank embodying a joint according to the present invention and set up for soldering by high frequency induction heating to solder the joint.

Figures 2 and 3 are a fragmentary sectional plan view and a cross sectional view respectively of the radiator header tank showing details of the joint on an enlarged scale.

Figure 4 is a detail cross sectional view of the joint of the tank after soldering and on a still larger scale, whilst Figures 5, 6 and 7 are views similar to Figure 4 showing alternative constructions of a joint according to this invention prior to soldering.

Throughout the drawings similar parts are designated by the same reference numerals.

In accordance with this invention the base or tube plate 2 of a radiator block 3 is formed with an endless marginal groove 4 and the body part 5 of the tank to be fitted thereon is provided along its edges with an outwardly extending endless flange 6, which flange 6 is adapted to be positioned so as to lie in the bottom of the groove 4 of the tube plate 2.

The said flange 6 is shown stepped or cranked outwardly from the sides of the tank body part 5, the stepped wall portion 7 so formed locating with clearance against and over the inner side 8 of the groove 4 in the tube plate 2 when the tank body part 5 is placed in position with the flange 6 thereof in the groove 4 of said plate 2 (see Figures 2, 3 and 4).

The flange 6 is of flat form and as shown in Figures 3 and 4 is of a width such that it extends across and against the flat bottom of the groove 4 for transverse location between the perpendicular sides of the groove and thus ensures that the stepped portion 7 lies against the side of the groove 8.

In order to solder the body part 5 to the tube plate 2 the latter is arranged in a horizontal position and the body part 5 placed thereon with the flange 6 located in the groove 4 of the plate 2. Cold solder in the form of wire 9 is then placed in the groove 4 on top of the flange 6, the solder wire extending all the way round the groove 4 so that the ends of said wire 9 abut with one another as at 9¹ in Figure 1.

A high frequency induction heating coil 10 connected to a generator indicated at 11 (Figure 1) is then arranged around the perimeter of the tube plate 2 in the same plane thereof (Figure 3) and switched on whereupon the solder wire 9 fuses and runs between the flange 6 and groove 4 and also by capillary action between the stepped portion 7 and inner side 8 of the groove 4 (Figure 4) to effect soldering of the joint. It is to be understood that the tube plate 2 must be kept in a horizontal position during the soldering operation in order to retain the molten solder in the groove 4.

In addition to reinforcing the edge portion of the tank body part 5 the flange 6 maintains the stepped wall portion 7 against the side 8 of the groove and counteracts any tendency of the wall portion 7 to buckle when subject to induction heating.

In the manufacture of radiators the above described soldering of the header tanks 1 is effected after the tube plates 2 have been secured to the tube assembly or block 3.

If desired the flange 6 may be inwardly directed as shown in Figures 6 and 7, the joint being then wholly within the tank to give a substantially flush exterior thereto at the joint, while in either case the joint may be simplified by omitting the stepped portion 7 as shown in Figures 5 and 6.

Furthermore, the solder may be fused by heating same by other sources of heat such as, where applicable, by heating the joint in a furnace.

I claim:

1. A radiator for the liquid cooling system of an internal combustion engine, said radiator having upper and lower header tanks connected by radiator tubes, each said header tank comprising a dished body part having a continuous substantially vertically disposed wall, in combination with a radiator tube plate in which said tubes are secured by liquid tight joints in such a manner that their bores are in communication with the interior of said header tank, said body part having an endless substantially flat permanent form marginal flange extending substantially at right angles from its vertical wall at the edge of the latter, and said tube plate having a permanent form endless marginal groove of open form having a flat bottom with sides perpendicular thereto and receiving the flat flange and adjacent wall portion of said body part, the flat flange being of a width so that it extends across and against the flat bottom of the groove for transverse location between the perpendicular sides of the latter with said adjacent wall portion of the body part against a perpendicular side of the groove, and solder in said groove extending continuously from between the flat flange and flat bottom of the groove to between the adjacent wall portion of the body part and said perpendicular side of the groove so as to form a liquid tight continuous joint uniting said body part to said tube plate.

2. A radiator for the liquid cooling system of an internal combustion engine, said radiator having upper and lower header tanks connected by radiator tubes, each said header tank comprising a dished body part having a continuous substantially vertically disposed wall, in combination with a radiator tube plate in which said tubes are secured by liquid tight joints in such a manner that their bores are in communication with the interior of said header tank, the wall of said body part having a cranked edge portion from which extends an endless substantially flat permanent form marginal flange substantially at right angles thereto at the edge of said cranked portion and said tube plate having a permanent form endless marginal groove of open form having a flat bottom with sides perpendicular thereto and receiving the flat flange and adjacent cranked portion of the wall of said body part, the flat flange being of a width so that it extends across and against the flat bottom of the groove for transverse location between the perpendicular sides of the latter with said adjacent cranked portion of the body part against and over a perpendicular side of the groove, and solder in said groove extending continuously from between the flat flange and flat bottom of the groove to between the adjacent cranked portion of the wall of the body part and said perpendicular side of the groove so as to form a liquid tight continuous joint uniting said body part to said tube plate.

ALAN LOUIS GARRATT.

References Cited in the file of this patent

UNITED STATES PATENTS

| Number | Name | Date |
|---|---|---|
| Re. 11,935 | Maconochie | Oct. 8, 1901 |
| 193,108 | Bell | July 17, 1877 |
| 243,232 | Fancher | June 21, 1881 |
| 262,143 | Stevenson | Aug. 1, 1882 |
| 901,375 | Rigby | Oct. 20, 1908 |
| 925,201 | Lauterback | June 15, 1909 |
| 1,435,384 | Fleischer | Nov. 14, 1922 |
| 1,959,464 | Dryden | May 22, 1934 |
| 2,071,583 | Schutt | Feb. 23, 1937 |
| 2,184,658 | Young | Dec. 26, 1939 |
| 2,323,985 | Fausek | July 13, 1943 |
| 2,506,051 | Young | May 2, 1950 |